US009900319B2

(12) United States Patent
Smith et al.

(10) Patent No.: US 9,900,319 B2
(45) Date of Patent: Feb. 20, 2018

(54) RESILIENT NETWORK CONSTRUCTION USING ENHANCED PRIVACY IDENTIFICATION

(71) Applicant: Intel Corporation, Santa Clara, CA (US)

(72) Inventors: Ned M. Smith, Beaverton, OR (US); Nathan Heldt-Sheller, Portland, OR (US)

(73) Assignee: Intel Corporation, Santa Clara, CA (US)

(*) Notice: Subject to any disclaimer, the term of this patent is extended or adjusted under 35 U.S.C. 154(b) by 106 days.

(21) Appl. No.: 14/951,129

(22) Filed: Nov. 24, 2015

(65) Prior Publication Data

US 2017/0149792 A1    May 25, 2017

(51) Int. Cl.
| G06F 21/85 | (2013.01) |
| H04L 29/06 | (2006.01) |
| H04L 9/32 | (2006.01) |
| G06F 21/33 | (2013.01) |

(52) U.S. Cl.
CPC .......... *H04L 63/104* (2013.01); *H04L 9/3263* (2013.01); *H04L 63/101* (2013.01); *H04L 63/20* (2013.01)

(58) Field of Classification Search
None
See application file for complete search history.

(56) References Cited

U.S. PATENT DOCUMENTS

| 8,327,128 | B1* | 12/2012 | Prince | H04L 63/0823 |
| | | | | 713/150 |
| 2005/0065799 | A1* | 3/2005 | Dare | G06F 21/6245 |
| | | | | 705/50 |
| 2008/0313712 | A1* | 12/2008 | Ellison | H04L 63/101 |
| | | | | 726/4 |
| 2009/0141898 | A1 | 6/2009 | Huang | |
| 2011/0219067 | A1* | 9/2011 | Bernosky | H04L 29/12066 |
| | | | | 709/203 |

(Continued)

FOREIGN PATENT DOCUMENTS

| JP | 2007207188 A | 8/2007 |
| KR | 1020090012775 A | 2/2009 |

OTHER PUBLICATIONS

"International Application Serial No. PCT/US2016/053408, International Search Report dated Jan. 5, 2017", 3 pgs.

(Continued)

*Primary Examiner* — Venkat Perungavoor
(74) *Attorney, Agent, or Firm* — Schwegman Lundberg & Woessner, P.A.

(57) ABSTRACT

Systems and techniques for resilient network construction using enhanced privacy identification are described herein. A group certificate may be generated for a first device group. The first device group may include a plurality of devices having a shared attribute. A request may be received from a device of the plurality of devices for a data exchange session with a data partner device. The data partner device may be included in a second device group. The data exchange session may be enabled based on a set of permissions related to the group certificate. The set of permissions may define, at least in part, the accessibility of the second device group to the first device group.

21 Claims, 6 Drawing Sheets

(56) References Cited

U.S. PATENT DOCUMENTS

| | | | |
|---|---|---|---|
| 2013/0044878 A1* | 2/2013 | Rich | H04L 63/062 380/277 |
| 2013/0131838 A1 | 5/2013 | Washington et al. | |
| 2014/0241354 A1 | 8/2014 | Shuman et al. | |
| 2015/0081846 A1* | 3/2015 | Ur-Rahman | H04L 67/141 709/218 |
| 2015/0181424 A1* | 6/2015 | Hardy | H04L 63/0272 726/7 |
| 2015/0312331 A1* | 10/2015 | Crocker | H04L 67/104 709/205 |
| 2015/0358313 A1* | 12/2015 | Hussain | G06F 21/335 713/173 |

OTHER PUBLICATIONS

"International Application Serial No. PCT/US2016/053408, Written Opinion dated Jan. 5, 2017", 6 pgs.

* cited by examiner

RESILIENT NETWORK CONSTRUCTION USING ENHANCED PRIVACY IDENTIFICATION

BACKGROUND

Internet of things networks are often constructed using devices that are commissioned into the network having unique identifiers and unique credentials that are used to authenticate the device and protect command and control or data collection messages. Security and safety policy may dictate rules that restrict which controllers may access which sensors and which actuators. Policies may be expressed in ways that account for redundancy where standby and replacement devices and their credentials are comprehended by the other devices with which they must interact. This complexity may result in an order of magnitude increase in security policy expression and lifecycle cost.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
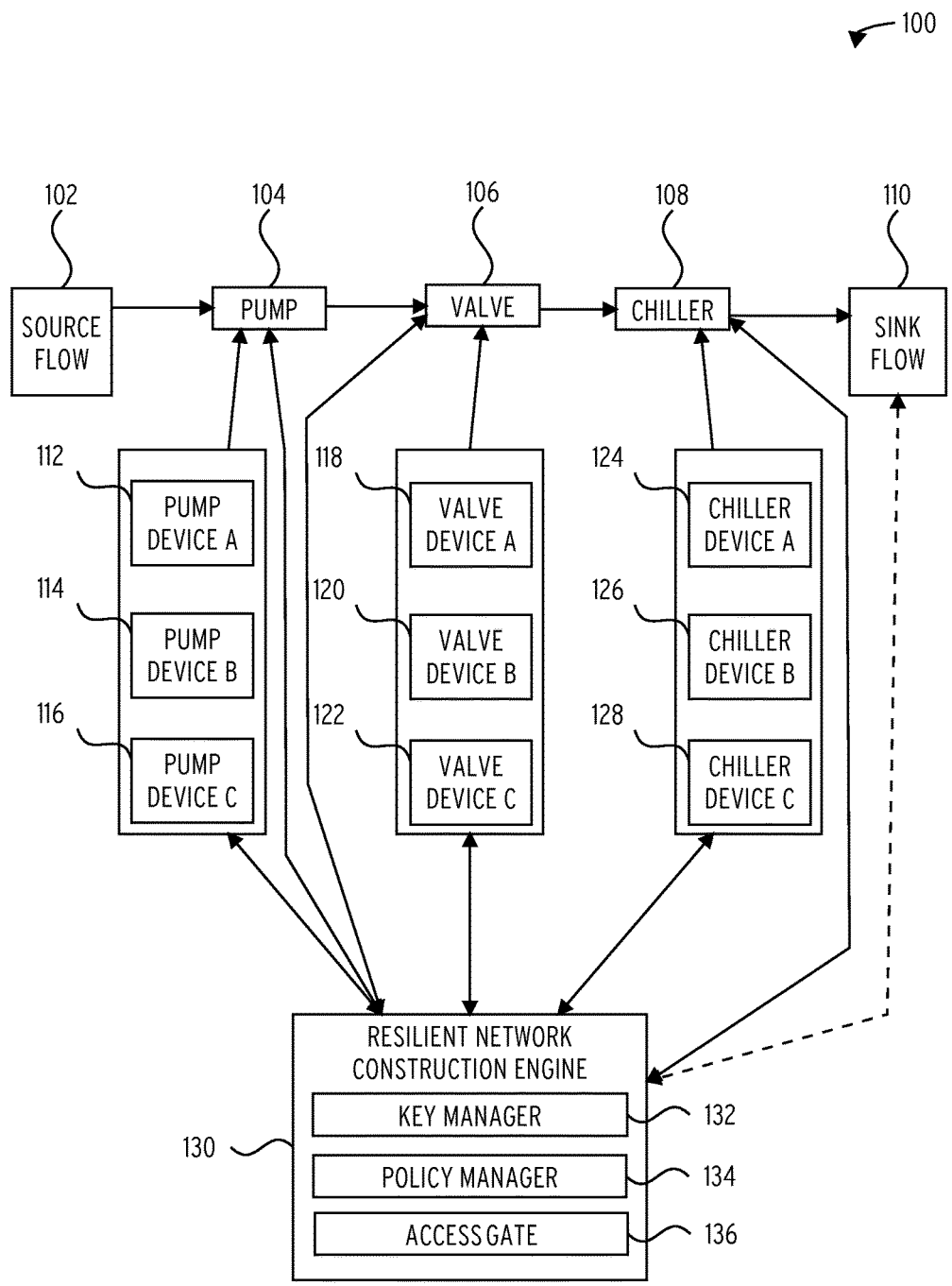
FIG. 1 illustrates an example environment and system for resilient network construction using enhanced privacy identification, according to an embodiment.

Cyber-physical networks may consider the possibility that network nodes may be redundant (e.g., a primary device and a standby device). Redundancy may imply immediate fail-over re-routing or may imply periodic maintenance where downtimes can be scheduled. Resiliency in network design aims to provide redundancy to recover lost functionality should a portion of the network fail or be taken down for maintenance. For example, a workflow may be designated that relies on a device at each step, if a device fails or is taken down for maintenance the workflow may not be able to complete. Network resiliency design practice may employ redundancy and distribution to ensure accidental failures and purposeful attacks do not result in long-term loss of availability. The increased security policy complexity and lifecycle management cost incurred by replicating resources within the network may present a challenge in resilient network designs.

Using Enhanced Privacy ID (EPID) to create group credentials for replicated Internet of Things (IoT) devices may simplify policy expressions and may hide the actual complexity normally visible to lifecycle operations. EPID keys may be issued to each device in a resilient IoT network. An EPID group may be defined by the type of device employed. For example, in a factory automation application a system of pumps and valves may be described in terms of a manufacturer and model. The specific instance (e.g., device ID) may be hidden. The factory automation workflow may be described in terms of the device's function. When a redundant instance of a device is needed (e.g., ACME P250 pump 2 deployed as a standby pump), an IoT application may not be aware of the underlying complexity. Security policies may be defined in terms of the desired function and device type information (e.g., ACME P250 or equivalent pump).

A key issuer may join (e.g., add a device to the network) each IoT device by issuing the device a unique private EPID key. The device may send a message to a verifier signed with the private EPID key. The verifier may validate the EPID signature using an EPID group key issued by the key issuer. The IoT device's identity may be hidden as the verifier uses the signature and the group public key to authenticate the device rather than device specific information.

An EPID group certificate may identify the workflow function. However, each device may be issued a unique EPID private key. If a first device fails and automated and/or manual steps are taken to switch to a backup device, the backup device may authenticate its signaling messages using its respective EPID private key, however, a data partner device (e.g., receiving device) that authenticates the device signaling may rely on the same EPID group certificate already provisioned.

This approach may allow the actual complexity of switching to a redundant device to be hidden creating simplified apparent complexity. The frequency of policy updates (e.g., adding or removing access control lists (ACLs), updating a credential, or invalidating a cached revocation result) transmitted to the data partner device may be reduced by managing policies using the apparent complexity.

FIG. 1 illustrates an example environment 100 and resilient network construction engine 130 for resilient network construction using enhanced privacy identification, according to an embodiment. The environment 100 may include a workflow between a source flow 102 and a sink flow 110. The workflow may define functional components and/or controllers for completing the workflow such as pump 104, valve 106, and chiller 108. Each function may be associated with one or more specific device that is capable of performing the designated function. In situations where resiliency is desired, a plurality of devices may be associated with the designated function thereby providing continuous operation in the event of a failure or maintenance.

The environment 100 illustrates an example of a workflow with resiliency at pump 104, valve 106, and chiller 108. The pump 104 function may be associated with a plurality of pump devices including pump device A 112, pump device B 114, and pump device C 116. The valve 106 function may be associated with a plurality of valve devices including valve device A 118, valve device B 120, and valve device C 122. The chiller 108 function may be associated with a plurality of chiller devices including chiller device A 124, chiller device B 126, and chiller device C 128. Each of the devices may be internet of things (IoT) devices may include sensors that are connected to a network (e.g., the internet, wireless, etc.) to communicate data to the controllers or other components of the network.

The environment 100 includes a resilient network construction engine 130 including a key manager 132, policy manager 134, and access gate 136. The resilient network construction engine 130 may use enhanced privacy identification (EPID) to manage devices on the network. EPID allows devices to be authenticated as part of a group rather than as an individual which increases security by keeping the actual identification of the device secret.

Key manager 132 generates a device group based on a shared attribute of a plurality of devices. For example, pump devices A 112, B 114, and C 116 may all be ACME pump model P250 and the group may be ACME P250. The key manager 132 may generate a group certificate for the device group. For example, a key may be generated for the group ACME P250. Each device in the ACME P250 device group may then be authenticated using the group key rather than its own individual private key. While the example includes 3 devices in each device group, it will be understood that a device group may contain any number of devices.

In an example, the key manager 132 may generate a device certificate for each device of the plurality of devices. For example, upon joining the network each device may be issued a unique EPID certificate to each of pump device A 112, pump device B 114, and pump device C 116. In an example, the key manager 132 may validate a signature created with the device certificate using the group certificate. For example, pump device A 112 may have a unique device certificate that may be used to sign a data exchange request sent to valve device A 118. The ACME P250 group certificate may be used to authenticate the signature created using pump device A's 112 private device certificate.

In an example, the key manager 132 may apply an encryption algorithm to the device certificate and/or the group certificate. Various encryption techniques may be employed such as symmetrical encryption and/or public-key encryption. The certificate may be encoded using an encryption technique to prevent an unauthorized receiver from being able to read the contents of the certificate which may prevent the unintentional release of private information. In an example, a decryption algorithm may be applied to the device certificate and/or the group certificate. For example, an encrypted device certificate may be decrypted allowing the contents of the certificate to be read by an authorized entity.

The policy manager 134 may create an access control list. For example, valve 106 may be configured to receive data from pump 104. However, it may be desired to limit the data stream to those devices which are specifically authorized to communicate with valve 106. For example, pump device A 112, B 114, and C 116. The access control list may be created with each individual device that is authorized to communicate data to valve 106. However, that may result in high management costs as the list may be updated each time a device is added to or removed from the network. In addition, the frequent policy updates may increase network overhead. To address these issues the policy manager 134 may assign access rights to the group rather than to the individual devices.

The access gate 136 may receive a request from a device of the group of devices for a data exchange with a data partner device. For example, pump device A 112 may wish to exchange data with the valve 106 (e.g., data partner device). The access gate 136 may enable the data exchange based on the access control list and an association between the device group and the set of permissions. For example, the request may be sent by pump device A 112 to valve device A 118 and may be signed using pump device A's 112 private device certificate. The access gate 136 may check the access control list to verify that the ACME P250 group has permission to exchange data with valve 106 and may validate the signature created using the private device certificate of pump device A 112 using ACME P250's group certificate. In an example, the set of permissions may include create, read, update, delete, and/or notify. The access gate 130 may communicate with the key manager 132 to verify that the group certificate is valid for the ACME P250 group. Upon verifying the permissions contained in the access control list and that the certificate is valid, the data exchange may be allowed to progress.

The valve 106 function may be associated with a plurality of valve devices. Each valve device may receive copy of the access control list and may be able to use the access gate 136 to verify the relevant permissions and certificate validity based on its association with the valve 106 function.

In an example, the association between the device and the plurality of devices may be obtained from a master device of the plurality of devices. For example, pump device A 112 may have a copy of a list of the members of the ACME P250 group. In an example, one or more of the plurality of devices may send a nomination response and the master device may be selected from the one or more devices using the nomination response. For example, pump device A 112 and pump device B 114 may send a nomination response indicating that they would like to be the master device and hold a copy of the group membership list. Pump device A 112 may be selected as the master because, for example, the response time included in the nomination response was lower than that included in the nomination response of pump device B 114.

In an example, an indication of a workflow may be obtained and the workflow indication may include a data partner source device and a device type indicated by the shared attribute of the plurality of devices. The access control list may be assigned to the data partner device based on the indication of the workflow. In an example, the indication of the workflow may be obtained from a graphical user interface (GUI) configured to allow the graphical creation of the workflow. For example, a GUI may be presented to a user of the system that allows for the creation of workflows. The GUI may include a variety of text, image, and control elements allowing the user to define workflows. For example, the user may be able to drag functional elements into a workflow configuration based on a desired function. For example, the user may be able to drag pump 104 function (e.g., an ACME pump P250 function, etc.) to valve 106 function (e.g., an ACME valve V250 function, etc.) thereby creating a flow from pump 104 function to valve 106 function.

In an example, the device group may be generated in response to obtaining the indication of the workflow. For example, when pump 104 function is dragged to valve 106 function, a pump 104 function group (e.g., a group for ACME pump P250) may be generated.

In an example, a device may be joined to the plurality of device and the device group in response to obtaining the indication of the workflow. For example, the user may drag pump device B 114 to valve 106 function and the device may be joined to the network and added to the pump 104 function device group.

In an example, each device may send a random number and a derivation of its device identifier to the key manager 132. The key manager 132 may derive a group name from the received data and generate the device group. The device group may then be issued a token that may be used to issue certificates for the device group.

Figure 2:
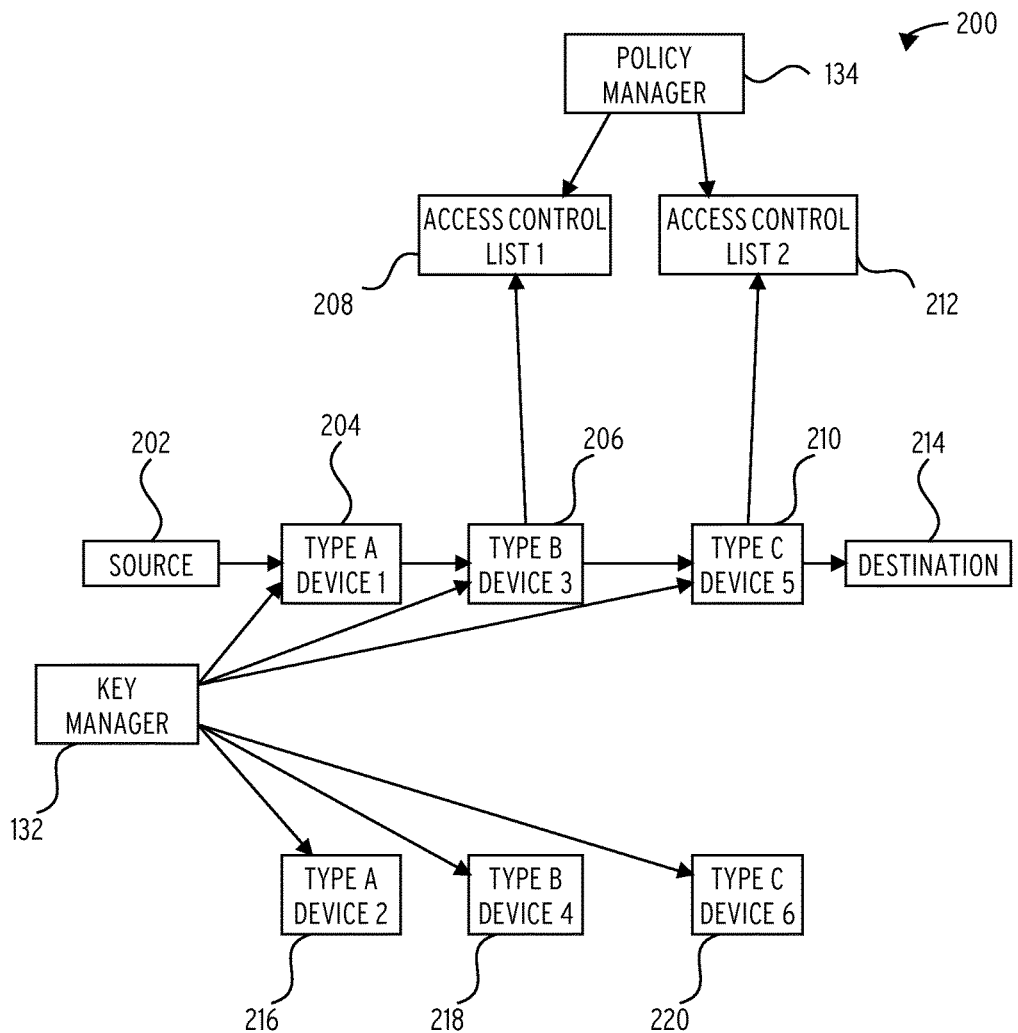
FIG. 2 illustrates a block diagram of an example of actual complexity in a resilient network using enhanced privacy identification system, according to an embodiment.

FIG. 2 illustrates a block diagram of an example of actual complexity in a resilient network using enhanced privacy identification system 200, according to an embodiment. The system 200 may include a workflow with functional components type A device 1 204, type B device 3 206, type C device 5 210, type A device 2 216, type B device 4 218, and type C device 6 220. The functional components may be used in completing the workflow between a source 202 and a destination 214. Type A device 1 204, type B device 3 206, and type C device 5 210 may each be primary devices for their respective functions and type A device 2 216, type B device 4 218, and type C device 6 220 may each be redundant devices for their respective function. For example, if type A device 1 204 fails, type A device 2 216 may come online to minimize impact on the workflow.

The system 200 may define a functionally decomposed workflow application. Functions requiring resiliency may be identified. An access control policy naming workflow source(s) that may authenticate to functional destinations may be defined. Access control lists may be authored for the functional destination. The workflow may be executed. An EPID group may be created for each functional component by the key manager 132 and group certificates may be issued. Devices may be commissioned into the network that perform a function of the workflow. Each redundant device of similar device type may be joined using EPID to create a unique private key for each device. The key manager 132 may broadcast and/or multicast a discovery message to each device capable of performing the workflow function and may provision each respondent into the same EPID device group. The policy manager 134 may provision access control lists and certificates to each device corresponding with the functional destination. Each device corresponding with the functional destination may receive a copy of the access control lists and the certificates. On-going monitoring, maintenance, and end-of-life operations may be performed.

The key manager 132, as described in FIG. 1, may issue a private key to each of the devices and may use the private key to authenticate with an upstream device of the workflow. For example, a private key issued to type A device 1 204 may be used to authenticate with type B device 3 206. To accomplish redundancy type A device 1 204 and type A device 2 216 may have each been issued a unique private key that may be used respectively to authenticate with type B device 3 206 and type B device 218 respectively.

The policy manager 134, as described in FIG. 1, may generate access control lists such as access control list 1 208 and access control list 2 212. For example, access control list 1 208 and access control list 2 212 may be generated for type B device 3 206 and type C device 5 210, respectively. The access control list expressing this policy may be complicated because each authenticating device may need to have a copy of the access control list and each source device may need to be individually added to the access control list.

If a third device is added or an existing device is removed, the access control list policy may be updated accordingly. Should the authenticating device verifying the source device signatures cache context used for verification such as, for example, pre-computing signatures, caching revocation list entries, and protecting trust anchors experience changes in redundancy operations, an update may be sent to the authenticating devices.

Figure 3:
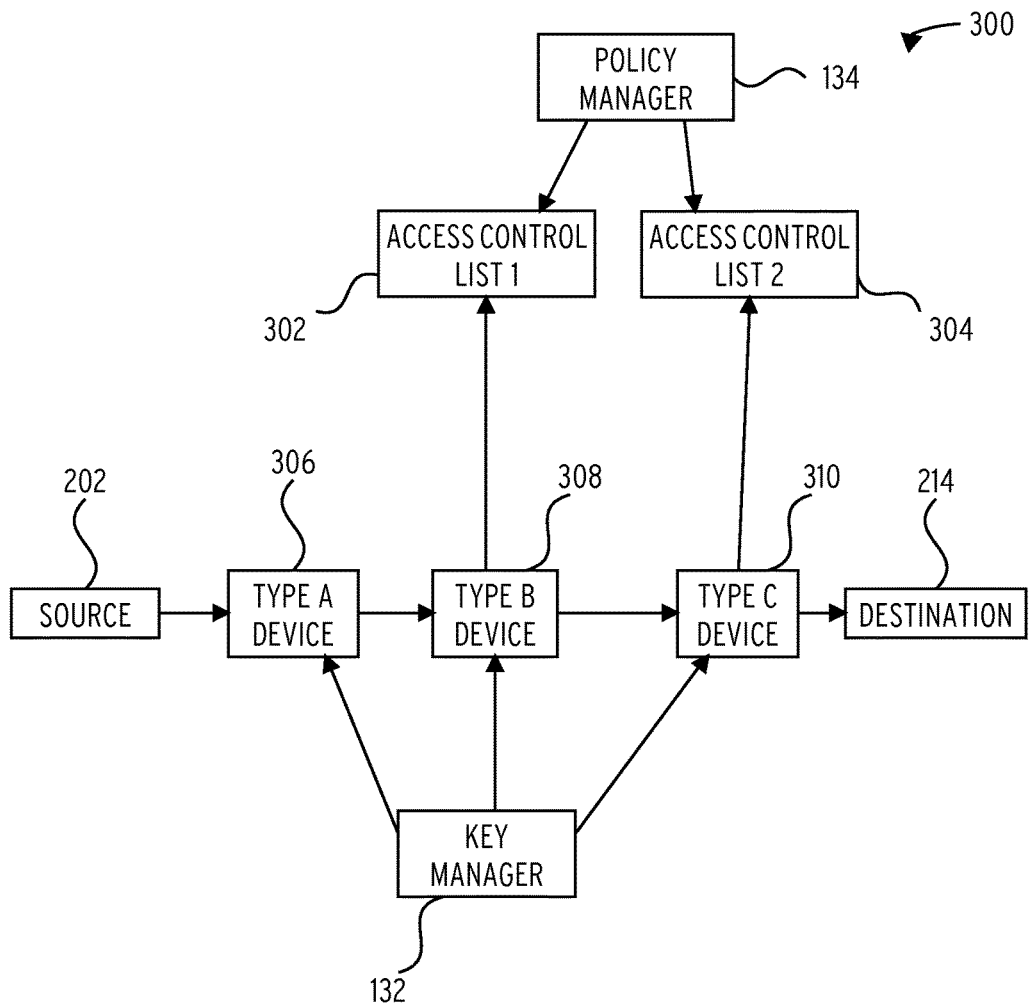
FIG. 3 illustrates a block diagram of an example of apparent complexity in a resilient network using enhanced privacy identification system, according to an embodiment.

FIG. 3 illustrates a block diagram of an example of apparent complexity in a resilient network using enhanced privacy identification system 300, according to an embodiment. The system 300 may enable apparent complexity by using EPID to manage group access for devices. A resilient IoT application employing the system 300 may hide the actual complexity of the network by issuing keys, assigning access control lists, and authenticating at a group level rather than the individual device level.

The system 300 may define a functionally decomposed workflow application. Functions requiring resiliency may be identified. An access control policy naming workflow source(s) that may authenticate to functional destinations may be defined. Access control lists may be authored for the functional destination. The workflow may be executed.

The system 300 may include a key manager 132 as described in FIG. 1 and a policy manager 134 as described in FIG. 1. Upstream devices such as type B device 308 and type C device 310 may use access gate 136 as described in FIG. 1 to authenticate the downstream devices for data exchange.

The access control lists such as access control list 1 302 and access control list 2 304 may be generated by the policy manager 134 based on function (e.g., type B device, type C device, etc.) rather than the individual device performing the function. A single access control list source may be identified in the policy. For example, access control list 1 302 may define permissions for type A devices rather than a specific type A device.

The key manager 132 may create a device group for a plurality of devices based on a shared attribute. For example, there may be ten ACME P250 pump devices and the key manager 132 may create a group ACME P250 based on the manufacturer and model number. The key manager 132 may generate a group certificate and/or key for the device group. For example, a group certificate may be generated for the ACME P250 pump group.

The policy manager 134 may create an access control list including the device group. The access control list may define a set of permissions for the device group and may include the group certificate. For example, access control list 1 302 may be assigned to type B device 308 and may grant the ACME P250 pump group read access to type B devices and may include the ACME P250 group certificate.

A request may be received from a device of the plurality of devices for a data exchange with a partner data device. For example, a type B device 308 may receive a request from a type A device 306 to exchange data. The data exchange may be enabled based on the access control list and an association between the device group and the set of permissions. For example, type B device 308 may use the access gate 136 to contact the key manager 132 to verify the group certificate is valid and that type A devices have read permissions to type B devices.

In some cases an individual device may be removed from the network. For example, the device's credentials may be come compromised. In such an instance, the device may be physically removed from the network or the key manager 132 may remedy the compromised device by, for example, deleting the private key, revoking the device specific key and issuing a new private key to the compromised device and/or by revoking the signature of the compromised private key and migrating all but the revoked device private keys to a new device group.

The data partner device may see no change or may receive a re-issued credential from the key manager 132 thereby reducing the complexity of the access control lists and reducing the number of policy updates that may be sent by the policy manager 134.

Figure 4:
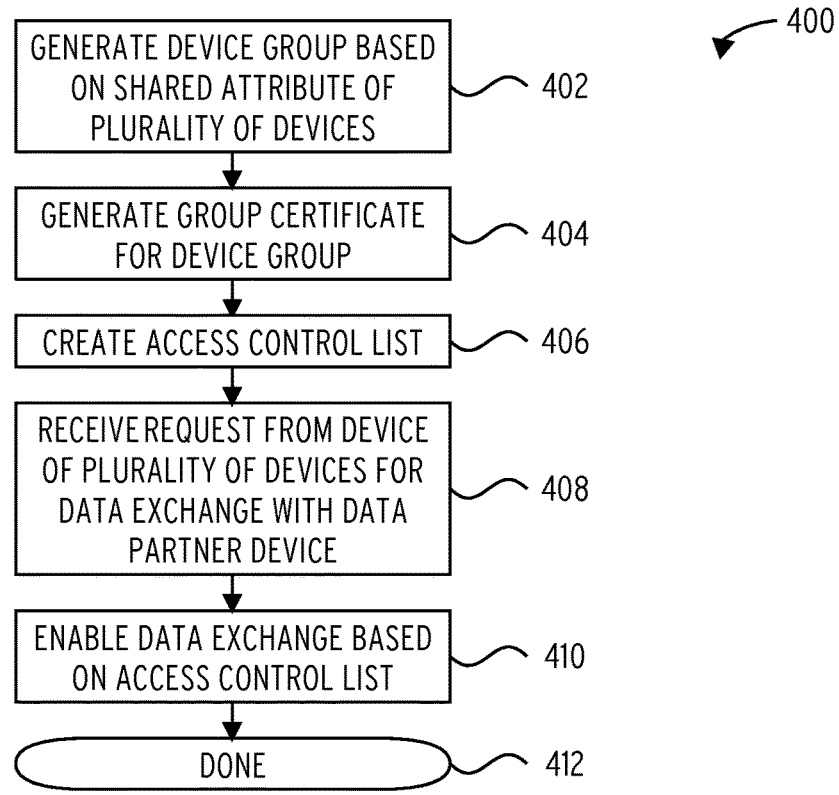
FIG. 4 illustrates an example of a method 400 for resilient network construction using enhanced privacy identification, according to an embodiment.

FIG. 4 illustrates an example of a method 400 for resilient network construction using enhanced privacy identification, according to an embodiment.

At operation 402, method 400 generates a device group based on a shared attribute of a plurality of devices.

At operation 404, method 400 generates a group certificate for the device group. In an example, an encryption algorithm may be applied to the group device certificate. In an example, a decryption algorithm may be applied to the group certificate.

At operation 406, method 400 creates an access control list. In an example, the access control list includes the device group. In an example, the access control list defines a set of permissions for the device group. In an example, the set of permissions may include read, update, and delete.

At operation 408, method 400 receives a request from a device of the plurality of devices for a data exchange with a data partner device.

At operation 410, method 400 enables the data exchange based on the access control list and an association between the device group and the set of permissions.

At operation 412, method 400 ends.

In some embodiments, method 400 further comprises generating a device certificate for each device of the plurality of devices. In an example, method 400 may include applying an encryption algorithm to the device certificate. In an example, method 400 may include applying a decryption algorithm to the device certificate. In an example, enabling the data exchange may include validating a signature created with the device certificate using the group certificate.

In some embodiments, method 400 further comprises obtaining an indication of a workflow, the indication of the workflow including a data partner source and a device type indicated by the shared attribute of the plurality of devices and assigning the access control list to the data partner device based on the indication of the workflow. In an example, the indication is obtained from a graphical user interface configured to allow graphical creation of the workflow. In an example, the device group is generated in response to obtaining the indication of the workflow. In an example, a device may be automatically joined to the plurality of devices and to the device group in response to obtaining the indication of the workflow.

In some embodiments, the association between the device and the plurality of devices may be obtained from a master device of the plurality of devices. In an example, one or more devices of the plurality of devices may send a nomination response and the master device may be selected from the one or more devices using the nomination response.

Figure 5:
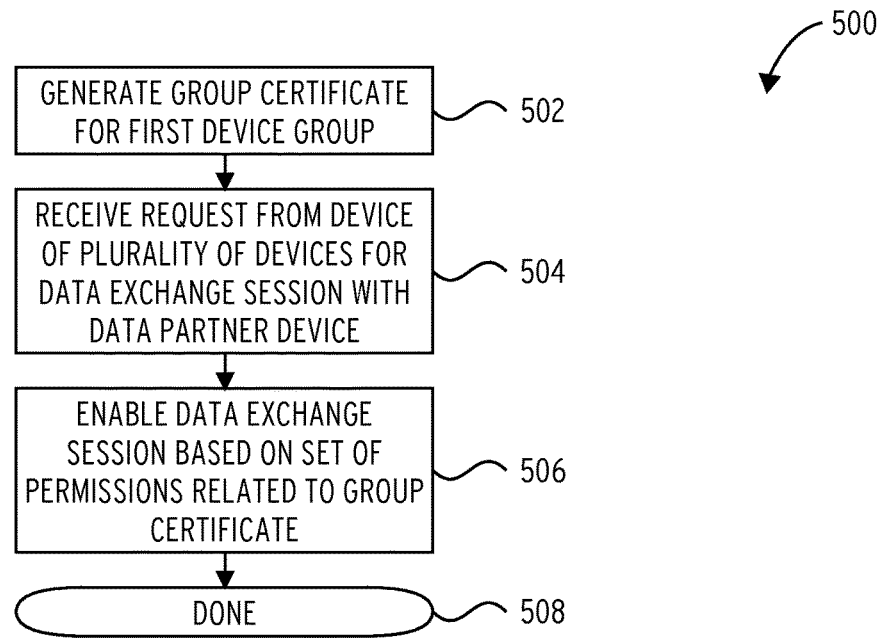
FIG. 5 illustrates an example of a method for resilient network construction using enhanced privacy identification, according to an embodiment.

FIG. 5 illustrates an example of a method 500 for resilient network construction using enhanced privacy identification, according to an embodiment.

At operation 502, method 500 generates a group certificate for a first device group, the first device group including a plurality of devices having a shared attribute.

At operation 504, method 500 receives a request from a device of the plurality of devices for a data exchange session with a data partner device. In an example, the data partner device is included in a second device group. In an example, the request may be received over a network (e.g., wireless, wired, etc.).

At operation 506, method 500 enables the data exchange session based on a set of permissions related to the group certificate. In an example, the set of permissions defines at least in part the accessibility of the second device group to the first device group. In an example, enabling the data exchange session based on the set of permissions includes referring to an access control list (ACL). In an example, the ACL defines at least in part a relationship between the first device group and create, read, update, delete, or notify permissions of the first device group with respect to the second device group.

In an example, enabling the data exchange session based on the set of permissions includes referring to a whitelist to determine whether the device of the first device group is permitted to initiate the data exchange session with the data partner device. In an example, enabling the data exchange session based on the set of permissions includes referring to a blacklist to determine whether the device of the first device group is permitted to initiate the data exchange session with the data partner device.

In an example, enabling the data exchange session based on the set of permissions includes referring to a role-based access control list to determine whether a role corresponding with the device of the first device group is permitted to initiate the data exchange session with the data partner device.

At operation 508, method 500 ends.

In some embodiments, method 500 further comprises generating a device certificate for each device of the plurality of devices. In an example, method 500 may include applying an encryption algorithm to the device certificate. In an example, method 500 may include applying a decryption algorithm to the device certificate. In an example, enabling the data exchange may include validating a signature created with the device certificate using the group certificate.

In some embodiments, method 500 further comprises obtaining an indication of a workflow, the indication of the workflow including a data partner source and a device type indicated by the shared attribute of the plurality of devices and creating the set of permissions based on the indication of the workflow. In an example, the indication is obtained from a graphical user interface configured to allow graphical creation of the workflow. In an example, the device group is generated in response to obtaining the indication of the workflow. In an example, a device may be automatically joined to the plurality of devices and to the device group in response to obtaining the indication of the workflow.

In some embodiments, the set of permissions may be obtained from a master device of the second device group. In an example, one or more devices of the second device group may send a nomination response and the master device may be selected from the one or more devices using the nomination response.

Figure 6:
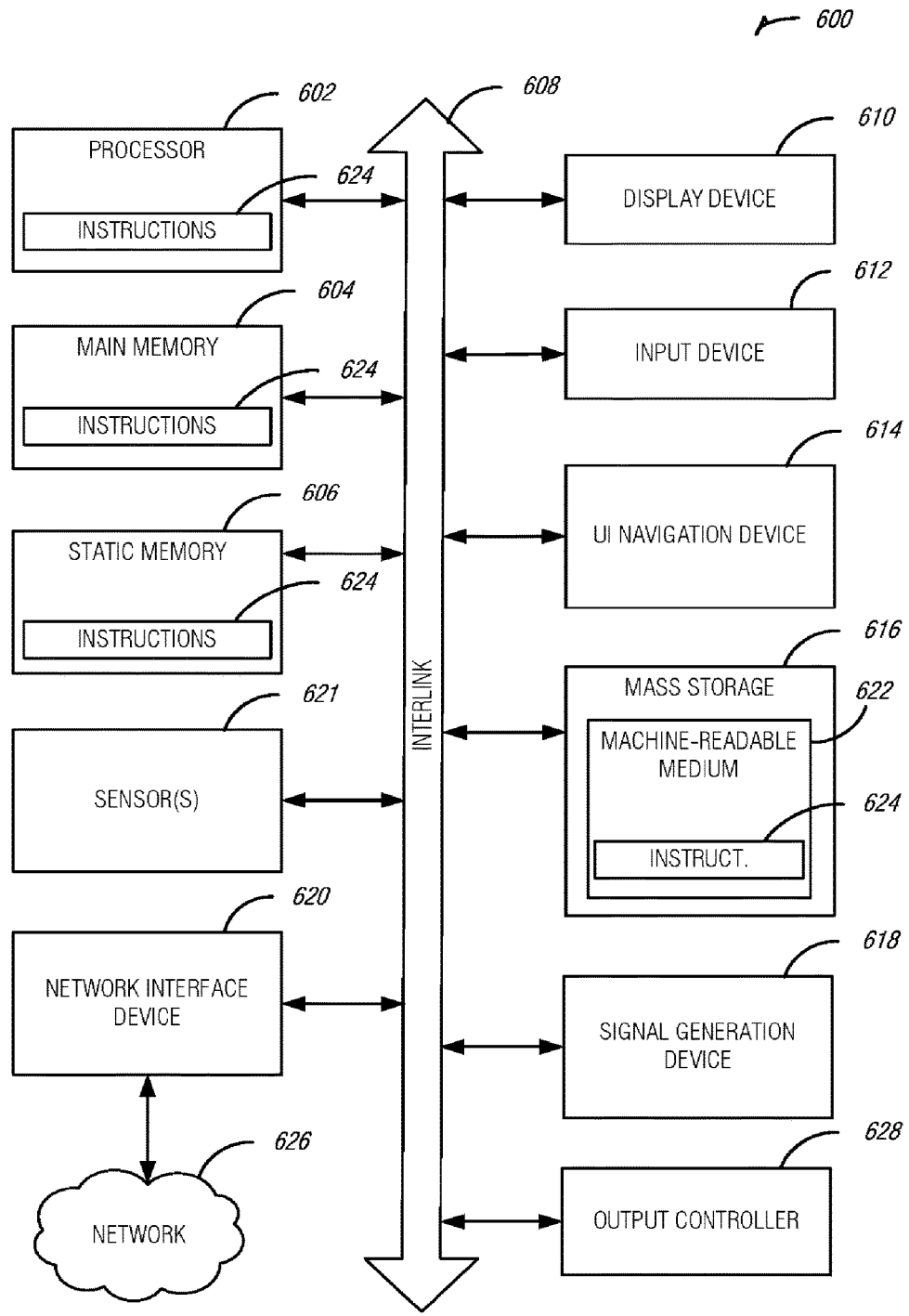
FIG. 6 illustrates a block diagram of an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes and Examples

Example 1 is a computing apparatus for resilient network construction using enhanced privacy identification, the computing apparatus comprising: a processor; and a memory storing instructions that, when executed by the processor, configure the computing apparatus to: generate a device group based on a shared attribute of a plurality of devices; generate a group certificate for the device group; create an access control list including the device group, the access control list defining a set of permissions for the device group; receive a request from a device of the plurality of devices for a data exchange with a data partner device; and enable the data exchange based on the access control list and an association between the device group and the set of permissions.

In Example 2, the subject matter of Example 1 optionally includes, wherein the instructions further configure the computing apparatus to generate a device certificate for each device of the plurality of devices.

In Example 3, the subject matter of Example 2 optionally includes, wherein the instructions further configure the computing apparatus to apply an encryption algorithm to the device certificate.

In Example 4, the subject matter of Example 3 optionally includes, wherein the instructions to receive the request from the device further configure the computing apparatus to apply a decryption algorithm to the device certificate.

In Example 5, the subject matter of any one or more of Examples 2-4 optionally include, wherein the instructions to enable the data exchange further configure the computing apparatus to validate a signature created with the device certificate using the group certificate.

In Example 6, the subject matter of any one or more of Examples 1-5 optionally include, wherein the instructions further configure the computing apparatus to: obtain an indication of a workflow, the indication of the workflow including a data partner source device and a device type indicated by the shared attribute of the plurality of devices; and assign the access control list to the data partner device based on the indication of the workflow.

In Example 7, the subject matter of Example 6 optionally includes, wherein the indication is obtained from a graphical user interface configured to allow graphical creation of the workflow.

In Example 8, the subject matter of any one or more of Examples 6-7 optionally include, wherein the device group is generated in response to obtaining the indication of the workflow.

In Example 9, the subject matter of any one or more of Examples 6-8 optionally include, wherein each device is automatically joined to the plurality of devices and to the device group in response to obtaining the indication of the workflow.

In Example 10, the subject matter of any one or more of Examples 1-9 optionally include, wherein the association between the device and the plurality of devices is obtained from a master device of the plurality of devices.

In Example 11, the subject matter of Example 10 optionally includes, wherein one or more devices of the plurality of devices send a nomination response and the master device is selected from the one or more devices using the nomination response.

In Example 12, the subject matter of any one or more of Examples 1-11 optionally include, wherein the instructions further configure the computing apparatus to identify the plurality of devices based on the shared attribute of the plurality of devices.

In Example 13, the subject matter of any one or more of Examples 1-12 optionally include, wherein the set of permissions includes read, update, and delete.

In Example 14, the subject matter of any one or more of Examples 1-13 optionally include, wherein the instructions further configure the computing apparatus to apply an encryption algorithm to the group certificate.

In Example 15, the subject matter of Example 14 optionally includes, the instructions to receive the request from the device further configure the computing apparatus to apply a decryption algorithm to the group certificate.

Example 16 is a computer-readable storage medium for resilient network construction using enhanced privacy identification, the computer-readable storage medium including instructions that when executed by a computer, cause the computer to: generate a device group based on a shared attribute of a plurality of devices; generate a group certificate for the device group; create an access control list including the device group, the access control list defining a set of permissions for the device group; receive a request from a device of the plurality of devices for a data exchange with a data partner device; and enable the data exchange based on the access control list and an association between the device group and the set of permissions.

In Example 17, the subject matter of Example 16 optionally includes, wherein the instructions further configure the computer to generate a device certificate for each device of the plurality of devices.

In Example 18, the subject matter of Example 17 optionally includes, wherein the instructions further configure the computer to apply an encryption algorithm to the device certificate.

In Example 19, the subject matter of Example 18 optionally includes, the instruction to receive the request from the device further configure the computer to apply a decryption algorithm to the device certificate.

In Example 20, the subject matter of any one or more of Examples 17-19 optionally include, wherein the instructions causing the computer to enable the data exchange further configure the computer to validate a signature created with the device certificate using the group certificate.

In Example 21, the subject matter of any one or more of Examples 16-20 optionally include, wherein the instructions further configure the computer to: obtain an indication of a workflow, the indication of the workflow including a data partner source device and a device type indicated by the shared attribute of the plurality of devices; and assign the access control list to the data partner device based on the indication of the workflow.

In Example 22, the subject matter of Example 21 optionally includes, wherein the indication is obtained from a graphical user interface configured to allow graphical creation of the workflow.

In Example 23, the subject matter of any one or more of Examples 21-22 optionally include, wherein the device group is generated in response to obtaining the indication of the workflow.

In Example 24, the subject matter of any one or more of Examples 21-23 optionally include, wherein each device is automatically joined to the plurality of devices and to the device group in response to obtaining the indication of the workflow.

In Example 25, the subject matter of any one or more of Examples 16-24 optionally include, wherein the association between the device and the plurality of devices is obtained from a master device of the plurality of devices.

In Example 26, the subject matter of Example 25 optionally includes, wherein one or more devices of the plurality of devices send a nomination response and the master device is selected from the one or more devices using the nomination response.

In Example 27, the subject matter of any one or more of Examples 16-26 optionally include, wherein the instructions further configure the computer to identify the plurality of devices based on the shared attribute of the plurality of devices.

In Example 28, the subject matter of any one or more of Examples 16-27 optionally include, wherein the set of permissions includes read, update, and delete.

In Example 29, the subject matter of any one or more of Examples 16-28 optionally include, wherein the instructions further configure the computer to apply an encryption algorithm to the group certificate.

In Example 30, the subject matter of Example 29 optionally includes, wherein the instructions to receive the request from the device further configure the computer to apply a decryption algorithm to the group certificate.

Example 31 is a method for resilient network construction using enhanced privacy identification, the method comprising: generating a device group on a shared attribute of a plurality of devices; generating a group certificate for the device group; creating an access control list including the device group, the access control list defining a set of permissions for the device group; receiving a request from a device of the plurality of devices for a data exchange with a data partner device; and enabling the data exchange based on the access control list and an association between the device group and the set of permissions.

In Example 32, the subject matter of Example 31 optionally includes, further comprising generating a device certificate for each device of the plurality of devices.

In Example 33, the subject matter of Example 32 optionally includes, further comprising applying an encryption algorithm to the device certificate.

In Example 34, the subject matter of Example 33 optionally includes, wherein receiving the request from the device further including applying a decryption algorithm to the device certificate.

In Example 35, the subject matter of any one or more of Examples 32-34 optionally include, wherein the enabling the data exchange further includes validating a signature created with the device certificate using the group certificate.

In Example 36, the subject matter of any one or more of Examples 31-35 optionally include, further comprising: obtaining an indication of a workflow, the indication of the workflow including a data partner source device and a device type indicated by the shared attribute of the plurality of devices; and assigning the access control list to the data partner device based on the indication of the workflow.

In Example 37, the subject matter of Example 36 optionally includes, wherein the indication is obtained from a graphical user interface configured to allow graphical creation of the workflow.

In Example 38, the subject matter of any one or more of Examples 36-37 optionally include, wherein the device group is generated in response to obtaining the indication of the workflow.

In Example 39, the subject matter of any one or more of Examples 36-38 optionally include, wherein a device is automatically joined to the plurality of devices and to the device group in response to obtaining the indication of the workflow.

In Example 40, the subject matter of any one or more of Examples 31-39 optionally include, wherein the association between the device and the plurality of devices is obtained from a master device of the plurality of devices.

In Example 41, the subject matter of Example 40 optionally includes, wherein one or more devices of the plurality of devices send a nomination response and the master device is selected from the one or more devices using the nomination response.

In Example 42, the subject matter of any one or more of Examples 31-41 optionally include, further comprising identifying the plurality of devices based on the shared attribute of the plurality of devices.

In Example 43, the subject matter of any one or more of Examples 31-42 optionally include, wherein the set of permissions includes read, update, and delete.

In Example 44, the subject matter of any one or more of Examples 31-43 optionally include, further comprising applying an encryption algorithm to the group certificate.

In Example 45, the subject matter of Example 44 optionally includes, wherein receiving the request from the device further includes applying a decryption algorithm to the group certificate.

Example 46 is a system for resilient network construction using enhanced privacy identification, the system comprising means to perform any method of Examples 31-44.

Example 47 is a machine readable medium for resilient network construction using enhanced privacy identification, the machine readable medium including instructions that, when executed by a machine, cause the machine to perform any method of Examples 31-44.

Example 48 is a system for resilient network construction using enhanced privacy identification, the system comprising: means for generating a device group on a shared attribute of a plurality of devices; means for generating a group certificate for the device group; means for creating an access control list including the device group, the access control list defining a set of permissions for the device group; means for receiving a request from a device of the plurality of devices for a data exchange with a data partner device; and means for enabling the data exchange based on the access control list and an association between the device group and the set of permissions.

In Example 49, the subject matter of Example 48 optionally includes, further comprising means for generating a device certificate for each device of the plurality of devices.

In Example 50, the subject matter of Example 49 optionally includes, further comprising means for applying an encryption algorithm to the device certificate.

In Example 51, the subject matter of Example 50 optionally includes, wherein receiving the request from the device further including applying a decryption algorithm to the device certificate.

In Example 52, the subject matter of any one or more of Examples 49-51 optionally include, wherein the enabling the data exchange further includes validating a signature created with the device certificate using the group certificate.

In Example 53, the subject matter of any one or more of Examples 48-52 optionally include, further comprising: means for obtaining an indication of a workflow, the indication of the workflow including a data partner source device and a device type indicated by the shared attribute of the plurality of devices; and means for assigning the access control list to the data partner device based on the indication of the workflow.

In Example 54, the subject matter of Example 53 optionally includes, wherein the indication is obtained from a graphical user interface configured to allow graphical creation of the workflow.

In Example 55, the subject matter of any one or more of Examples 53-54 optionally include, wherein the device group is generated in response to obtaining the indication of the workflow.

In Example 56, the subject matter of any one or more of Examples 53-55 optionally include, wherein a device is automatically joined to the plurality of devices and to the device group in response to obtaining the indication of the workflow.

In Example 57, the subject matter of any one or more of Examples 48-56 optionally include, wherein the association between the device and the plurality of devices is obtained from a master device of the plurality of devices.

In Example 58, the subject matter of Example 57 optionally includes, wherein one or more devices of the plurality of devices send a nomination response and the master device is selected from the one or more devices using the nomination response.

In Example 59, the subject matter of any one or more of Examples 48-58 optionally include, further comprising means for identifying the plurality of devices based on the shared attribute of the plurality of devices.

In Example 60, the subject matter of any one or more of Examples 48-59 optionally include, wherein the set of permissions includes read, update, and delete.

In Example 61, the subject matter of any one or more of Examples 48-60 optionally include, further comprising means for applying an encryption algorithm to the group certificate.

In Example 62, the subject matter of Example 61 optionally includes, wherein receiving the request from the device further includes applying a decryption algorithm to the group certificate.

Example 63 is a computing apparatus for resilient network construction, the computing apparatus comprising: a processor; and a memory storing instructions that, when executed by the processor, configure the computing apparatus to: generate a group certificate for a first device group, the first device group including a plurality of devices having a shared attribute; receive a request, over a network, from a device of the plurality of devices for a data exchange session with a data partner device, the data partner device included in a second device group; and enable the data exchange session based on a set of permissions related to the group certificate, the set of permissions defining at least in part the accessibility of the second device group to the first device group.

In Example 64, the subject matter of Example 63 optionally includes, wherein to enable the data exchange session based on the set of permissions includes: referring to an access control list (ACL), the ACL defining at least in part a relationship between the first device group and create, read, update, delete, or notify permissions of the first device group with respect to the second device group.

In Example 65, the subject matter of any one or more of Examples 63-64 optionally include, wherein to enable the data exchange session based on the set of permissions includes: referring to a whitelist to determine whether the device of the first device group is permitted to initiate the data exchange session with the data partner device.

In Example 66, the subject matter of any one or more of Examples 63-65 optionally include, wherein to enable the data exchange session based on the set of permissions includes: referring to a blacklist to determine whether the device of the first device group is permitted to initiate the data exchange session with the data partner device.

In Example 67, the subject matter of any one or more of Examples 63-66 optionally include, wherein to enable the data exchange session based on the set of permissions includes: referring to a role-based access control list to determine whether a role corresponding with the device of the first device group is permitted to initiate the data exchange session with the data partner device.

In Example 68, the subject matter of any one or more of Examples 63-67 optionally include, wherein the instructions further configure the computing apparatus to generate a device certificate for each device of the plurality of devices.

In Example 69, the subject matter of Example 68 optionally includes, wherein the instructions further configure the computing apparatus to apply an encryption algorithm to the device certificate.

In Example 70, the subject matter of Example 69 optionally includes, wherein the instructions to receive the request from the device further configure the computing apparatus to apply a decryption algorithm to the device certificate.

In Example 71, the subject matter of any one or more of Examples 68-70 optionally include, wherein the instructions to enable the data exchange further configure the computing apparatus to validate a signature created with the device certificate using the group certificate.

In Example 72, the subject matter of any one or more of Examples 63-71 optionally include, wherein the instructions further configure the computing apparatus to: obtain an indication of a workflow, the indication of the workflow including a data partner source device and a device type indicated by the shared attribute of the plurality of devices; and create the set of permissions related to the group certificate based on the indication of the workflow.

In Example 73, the subject matter of Example 72 optionally includes, wherein the indication is obtained from a graphical user interface configured to allow graphical creation of the workflow.

In Example 74, the subject matter of any one or more of Examples 72-73 optionally include, wherein the device group is generated in response to obtaining the indication of the workflow.

In Example 75, the subject matter of any one or more of Examples 72-74 optionally include, wherein each device is automatically joined to the plurality of devices and to the device group in response to obtaining the indication of the workflow.

In Example 76, the subject matter of any one or more of Examples 63-75 optionally include, wherein the set of permissions is obtained from a master device of the second device group.

In Example 77, the subject matter of Example 76 optionally includes, wherein one or more devices of the second device group send a nomination response and the master device is selected from the one or more devices using the nomination response.

In Example 78, the subject matter of any one or more of Examples 63-77 optionally include, wherein the instructions further configure the computing apparatus to identify the plurality of devices based on the shared attribute of the plurality of devices.

In Example 79, the subject matter of any one or more of Examples 63-78 optionally include, wherein the set of permissions includes read, update, and delete.

In Example 80, the subject matter of any one or more of Examples 63-79 optionally include, wherein the instructions further configure the computing apparatus to apply an encryption algorithm to the group certificate.

In Example 81, the subject matter of Example 80 optionally includes, the instructions to receive the request from the device further configure the computing apparatus to apply a decryption algorithm to the group certificate.

Example 82 is a method for resilient network construction, the method comprising: generating, using at least one processor, a group certificate for a first device group, the first device group including a plurality of devices having a shared attribute; receiving, over a network, a request from a device of the plurality of devices for a data exchange session with a data partner device, the data partner device included in a second device group; and enabling the data exchange session based on a set of permissions related to the group certificate, the set of permissions defining at least in part the accessibility of the second device group to the first device group.

In Example 83, the subject matter of Example 82 optionally includes, wherein enabling the data exchange session based on the set of permissions includes: referring to an access control list (ACL), the ACL defining at least in part a relationship between the first device group and create, read, update, delete, or notify permissions of the first device group with respect to the second device group.

In Example 84, the subject matter of any one or more of Examples 82-83 optionally include, wherein enabling the data exchange session based on the set of permissions includes: referring to a blacklist to determine whether the device of the first device group is permitted to initiate the data exchange session with the data partner device.

In Example 85, the subject matter of any one or more of Examples 82-84 optionally include, wherein enabling the data exchange session based on the set of permissions includes: referring to a role-based access control list to determine whether a role corresponding with the device of the first device group is permitted to initiate the data exchange session with the data partner device.

In Example 86, the subject matter of any one or more of Examples 82-85 optionally include, further comprising generating a device certificate for each device of the plurality of devices.

In Example 87, the subject matter of Example 86 optionally includes, further comprising applying an encryption algorithm to the device certificate.

In Example 88, the subject matter of Example 87, wherein receiving the request from the device further includes applying a decryption algorithm to the device certificate.

In Example 89, the subject matter of any one or more of Examples 86-88 optionally include, further comprising validating a signature created with the device certificate using the group certificate.

In Example 90, the subject matter of any one or more of Examples 82-89 optionally include, further comprising: obtaining an indication of a workflow, the indication of the workflow including a data partner source device and a device type indicated by the shared attribute of the plurality of devices; and creating the set of permissions related to the group certificate based on the indication of the workflow.

In Example 91, the subject matter of Example 90 optionally includes, wherein the indication is obtained from a graphical user interface configured to allow graphical creation of the workflow.

In Example 92, the subject matter of any one or more of Examples 90-91 optionally include, wherein the device group is generated in response to obtaining the indication of the workflow.

In Example 93, the subject matter of any one or more of Examples 90-92 optionally include, wherein a device is automatically joined to the plurality of devices and to the device group in response to obtaining the indication of the workflow.

In Example 94, the subject matter of any one or more of Examples 82-93 optionally include, wherein the set of permissions is obtained from a master device of the second device group.

In Example 95, the subject matter of Example 94 optionally includes, wherein one or more devices of the second device group send a nomination response and the master device is selected from the one or more devices using the nomination response.

In Example 96, the subject matter of any one or more of Examples 82-95 optionally include, further comprising identifying the plurality of devices based on the shared attribute of the plurality of devices.

In Example 97, the subject matter of any one or more of Examples 82-96 optionally include, wherein the set of permissions includes read, update, and delete.

In Example 98, the subject matter of any one or more of Examples 82-97 optionally include, further comprising applying an encryption algorithm to the group certificate.

In Example 99, the subject matter of Example 98 optionally includes, wherein receiving the request from the device further includes applying a decryption algorithm to the group certificate.

Example 100 is a system for resilient network construction using enhanced privacy identification, the system comprising means to perform any method of Examples 82-99.

Example 101 is a machine readable medium for resilient network construction using enhanced privacy identification, the machine readable medium including instructions that, when executed by a machine, cause the machine to perform any method of Examples 82-99.

Example 102 is a computer-readable storage medium for resilient network construction, the computer-readable storage medium including instructions that when executed by a computer, cause the computer to: generate, using at least one processor, a group certificate for a first device group, the first device group including a plurality of devices having a shared attribute; receive a request, over a network, from a device of the plurality of devices for a data exchange session with a data partner device, the data partner device included in a second device group; and enable the data exchange session based on a set of permissions related to the group certificate, the set of permissions defining at least in part the accessibility of the second device group to the first device group.

In Example 103, the subject matter of Example 102 optionally includes, wherein enabling the data exchange session based on the set of permissions includes: refer to an access control list (ACL), the ACL defining at least in part a relationship between the first device group and create, read, update, delete, or notify permissions of the first device group with respect to the second device group.

In Example 104, the subject matter of any one or more of Examples 102-103 optionally include, wherein enabling the data exchange session based on the set of permissions includes: refer to a whitelist to determine whether the device of the first device group is permitted to initiate the data exchange session with the data partner device.

In Example 105, the subject matter of any one or more of Examples 102-104 optionally include, wherein enabling the data exchange session based on the set of permissions includes: refer to a blacklist to determine whether the device of the first device group is permitted to initiate the data exchange session with the data partner device.

In Example 106, the subject matter of any one or more of Examples 102-105 optionally include, wherein enabling the data exchange session based on the set of permissions includes: refer to a role-based access control list to determine whether a role corresponding with the device of the first device group is permitted to initiate the data exchange session with the data partner device.

In Example 107, the subject matter of any one or more of Examples 102-106 optionally include, wherein the instructions further configure the computer to generate a device certificate for each device of the plurality of devices.

In Example 108, the subject matter of Example 107 optionally includes, wherein the instructions further configure the computer to apply an encryption algorithm to the device certificate.

In Example 109, the subject matter of Example 108 optionally includes, the instruction to receive the request from the device further configure the computer to apply a decryption algorithm to the device certificate.

In Example 110, the subject matter of any one or more of Examples 107-109 optionally include, wherein the instructions further configure the computer to validate a signature created with the device certificate using the group certificate.

In Example 111, the subject matter of any one or more of Examples 102-110 optionally include, wherein the instructions further configure the computer to: obtain an indication of a workflow, the indication of the workflow including a data partner source device and a device type indicated by the shared attribute of the plurality of devices; and create the set of permissions related to the group certificate based on the indication of the workflow.

In Example 112, the subject matter of Example 111 optionally includes, wherein the indication is obtained from a graphical user interface configured to allow graphical creation of the workflow.

In Example 113, the subject matter of any one or more of Examples 111-112 optionally include, wherein the device group is generated in response to obtaining the indication of the workflow.

In Example 114, the subject matter of any one or more of Examples 111-113 optionally include, wherein each device is automatically joined to the plurality of devices and to the device group in response to obtaining the indication of the workflow.

In Example 115, the subject matter of any one or more of Examples 102-114 optionally include, wherein the set of permissions is obtained from a master device of the second device group.

In Example 116, the subject matter of Example 115 optionally includes, wherein one or more devices of the second device group send a nomination response and the master device is selected from the one or more devices using the nomination response.

In Example 117, the subject matter of any one or more of Examples 102-116 optionally include, wherein the instructions further configure the computer to identify the plurality of devices based on the shared attribute of the plurality of devices.

In Example 118, the subject matter of any one or more of Examples 102-117 optionally include, wherein the set of permissions includes read, update, and delete.

In Example 119, the subject matter of any one or more of Examples 102-118 optionally include, wherein the instructions further configure the computer to apply an encryption algorithm to the group certificate.

In Example 120, the subject matter of Example 119 optionally includes, wherein the instructions to receive the request from the device further configure the computer to apply a decryption algorithm to the group certificate.

What is claimed is:

1. A computing apparatus for resilient network construction, the computing apparatus comprising:
a processor; and
a memory storing instructions that, when executed by the processor, configure the computing apparatus to:
generate a group certificate for a first device group, the first device group including a plurality of devices having a shared attribute, wherein the shared attribute includes a device type, wherein the group certificate is an enhanced privacy identity certificate, and wherein the plurality of devices are configured to operate on an internet of things network with use of the group certificate;
receive a request, over a network, from a device of the plurality of devices for a data exchange session with a data partner device, the data partner device included in a second device group, wherein the data partner device operates on the internet of things network, and wherein the second device group is indicated by a workflow for the internet of things network; and
enable the data exchange session based on a set of permissions related to the group certificate, the set of permissions defining at least in part the accessibility of the second device group to the first device group, wherein the set of permissions allows redundancy with the workflow based on the device type.

2. The computing apparatus of claim 1, wherein to enable the data exchange session based on the set of permissions includes:
referring to an access control list (ACL), the ACL defining at least in part a relationship between the first device group and create, read, update, delete, or notify permissions of the first device group with respect to the second device group.

3. The computing apparatus of claim 1, wherein the instructions further configure the computing apparatus to generate a device certificate for each device of the plurality of devices, wherein the device certificate is generated for each device during manufacturing.

4. The computing apparatus of claim 3, wherein the instructions to enable the data exchange session further configure the computing apparatus to validate a signature created with the device certificate using the group certificate.

5. The computing apparatus of claim 1, wherein the indication is obtained from a graphical user interface configured to allow graphical creation of the workflow.

6. A method for resilient network construction, the method comprising: generating, using at least one processor, a group certificate for a first device group, the first device group including a plurality of devices having a shared attribute, wherein the shared attribute includes a device type, wherein the group certificate is an enhanced privacy identity certificate, wherein the plurality of devices operate are configured to on an internet of things network with use of the group certificate; receiving, over a network, a request from a device of the plurality of devices for a data exchange session with a data partner device, the data partner device included in a second device group, wherein the data partner device operates on the internet of things network, and wherein the second device group is indicated by a workflow for the internet of things network; and enabling the data exchange session based on a set of permissions related to the group certificate, the set of permissions defining at least in part the accessibility of the second device group to the first device group, wherein the set of permissions allows redundancy with the workflow based on the device type.

7. The method of claim 6, wherein enabling the data exchange session based on the set of permissions includes:
referring to an access control list (ACL), the ACL defining at least in part a relationship between the first device group and create, read, update, delete, or notify permissions of the first device group with respect to the second device group.

8. The method of claim 6, further comprising generating a device certificate for each device of the plurality of devices, wherein the device certificate is generated for each device during manufacturing.

9. The method of claim 8, further comprising validating a signature created with the device certificate using the group certificate.

10. The method of claim 6, wherein the indication is obtained from a graphical user interface configured to allow graphical creation of the workflow.

11. A computer-readable storage medium for resilient network construction, the computer-readable storage medium including instructions that when executed by a computer, cause the computer to: generate, using at least one processor, a group certificate for a first device group, the first device group including a plurality of devices having a shared attribute, wherein the shared attribute includes a device type, wherein the group certificate is an enhanced privacy identity certificate, wherein the plurality of devices are configured to operate on an internet of things network with use of the group certificate; receive a request, over a network, from a device of the plurality of devices for a data exchange session with a data partner device, the data partner device included in a second device group, wherein the data partner device operates on the internet of things network, and wherein the second device group is indicated by a workflow for the internet of things network; and enable the data exchange session based on a set of permissions related to the group certificate, the set of permissions defining at least in part the accessibility of the second device group to the first device group, wherein the set of permissions allows redundancy with the workflow based on the device type.

12. The computer-readable storage medium of claim 11, wherein enabling the data exchange session based on the set of permissions includes:
refer to an access control list (ACL), the ACL defining at least in part a relationship between the first device group and create, read, update, delete, or notify permissions of the first device group with respect to the second device group.

13. The computer-readable storage medium of claim 11, wherein the instructions further configure the computer to generate a device certificate for each device of the plurality of devices, wherein the device certificate is generated for each device during manufacturing.

14. The computer-readable storage medium of claim 13, wherein the instructions further configure the computer to validate a signature created with the device certificate using the group certificate.

15. The computer-readable storage medium of claim 11, wherein the indication is obtained from a graphical user interface configured to allow graphical creation of the workflow.

16. A computer-readable storage medium for resilient network construction, the computer-readable storage medium including instructions that when executed by a computer, cause the computer to: generate a device group based on a shared attribute of a plurality of devices, wherein the shared attribute includes a device type, wherein the plurality of devices are configured to operate on an internet of things network; generate a group certificate for the device group, wherein the group certificate is an enhanced privacy identity certificate with use of the group certificate; create an access control list including the device group, the access control list defining a set of permissions for the device group; receive a request from a device of the plurality of devices for a data exchange with a data partner device included in a second device group, wherein the data partner device operates on the internet of things network, wherein the second device group is indicated by a workflow for the internet of things network; and enable the data exchange based on the access control list and an association between the device group and the set of permissions, wherein the set of permissions allows redundancy with the workflow based on the device type.

17. The computer-readable storage medium of claim 16, wherein the instructions further configure the computer to generate a device certificate for each device of the plurality of devices, wherein the device certificate is generated for each device during manufacturing.

18. The computer-readable storage medium of claim 17, wherein the instructions causing the computer to enable the data exchange further configure the computer to validate a signature created with the device certificate using the group certificate.

19. The computer-readable storage medium of claim 16, wherein the instructions further configure the computer to: assign the access control list to the data partner device based on the indication of the workflow.

20. The computer-readable storage medium of claim 19, wherein the indication is obtained from a graphical user interface configured to allow graphical creation of the workflow.

21. The computer-readable storage medium of claim 19, wherein the device group is generated in response to obtaining the indication of the workflow.

* * * * *

UNITED STATES PATENT AND TRADEMARK OFFICE
CERTIFICATE OF CORRECTION

PATENT NO. : 9,900,319 B2
APPLICATION NO. : 14/951129
DATED : February 20, 2018
INVENTOR(S) : Smith et al.

Page 1 of 1

It is certified that error appears in the above-identified patent and that said Letters Patent is hereby corrected as shown below:

In the Claims

In Column 20, Line 52, in Claim 6, after "comprising:", insert --¶--

In Column 20, Line 59, in Claim 6, after "certificate;", insert --¶--

In Column 20, Line 65, in Claim 6, after "and", insert --¶--

In Column 21, Line 24, in Claim 11, after "to:", insert --¶--

In Column 21, Line 31, in Claim 11, after "certificate;", insert --¶--

In Column 21, Line 37, in Claim 11, after "and", insert --¶--

In Column 22, Line 13, in Claim 16, after "to:", insert --¶--

In Column 22, Line 17, in Claim 16, after "network;", insert --¶--

In Column 22, Line 19, in Claim 16, after "certificate;", insert --¶--

In Column 22, Line 22, in Claim 16, after "group;", insert --¶--

In Column 22, Line 27, in Claim 16, after "and", insert --¶--

Signed and Sealed this
Fourteenth Day of April, 2020

Andrei Iancu
*Director of the United States Patent and Trademark Office*